United States Patent [19]
Ronin et al.

[11] Patent Number: 5,804,175
[45] Date of Patent: Sep. 8, 1998

[54] METHOD FOR PRODUCING CEMENT

[76] Inventors: Vladimir P. Ronin, Assistentvägen 334, S-951 64 Luleå ; Marwin Häggström, Ladstigen 31, S-954 34 Gammelstad, both of Sweden

[21] Appl. No.: 535,051

[22] PCT Filed: Apr. 29, 1994

[86] PCT No.: PCT/SE94/00389

§ 371 Date: Oct. 30, 1995

§ 102(e) Date: Oct. 30, 1995

[87] PCT Pub. No.: WO94/25411

PCT Pub. Date: Nov. 10, 1994

[30] Foreign Application Priority Data

Apr. 30, 1993 [SE] Sweden .................................. 9301493

[51] Int. Cl.$^6$ ........................... C04B 14/04; C04B 24/00; C04B 24/12
[52] U.S. Cl. ........................ 106/757; 106/711; 106/713; 106/714; 106/724; 106/727; 106/737; 106/802; 106/808; 106/819; 106/823; 524/2; 524/650
[58] Field of Search .................................. 106/711, 696, 106/713, 724, 727, 737, 757, 802, 808, 819, 823, 714; 524/2, 650; 241/170, 176

[56] References Cited

U.S. PATENT DOCUMENTS

| | | | |
|---|---|---|---|
| 4,495,228 | 1/1985 | Cornwell | 106/696 |
| 4,504,020 | 3/1985 | Nishida et al. | 241/176 |
| 5,234,754 | 8/1993 | Bache | 106/737 |

FOREIGN PATENT DOCUMENTS 61-021950  1/1986  Japan .

*Primary Examiner*—Michael Marcheschi
*Attorney, Agent, or Firm*—Alfred J. Mangels

[57] ABSTRACT

A method for producing cement useful for preparing pastes, mortars, concretes and other cement-based materials, having a high workability with reduced water content, high strength and density, and a rapid development of strength, which method includes a mechanicochemical treatment of cement. The method includes a two-stage mechanicochemical treatment of a mixture of cement and at least one of two components, the first component being a $SiO_2$-containing microfiller and the second component being a polymer in the form of a powdery water-reducing agent. In the first stage the cement and the first and/or the second component are intensively mixed in a dry state, whereby particles of the first and/or the second component are adsorbed on the cement particles. In the second stage the mixture obtained in the first stage is treated in milling equipment where the particles in the mixture receive in quick succession a large number of direct-changed impact impulses resulting in modification of the surface properties of the cement particles in the form of substantial increase of surface energy and chemical reactivity. The treatment in the second stage is carried out during a sufficiently long period of time in order that a 1-day compressive strength of a 20 millimeter per side cube of cement paste, which has been properly compacted under vibration and hardened at +20° C. in sealed conditions, at least equals 60 MPa.

20 Claims, 4 Drawing Sheets

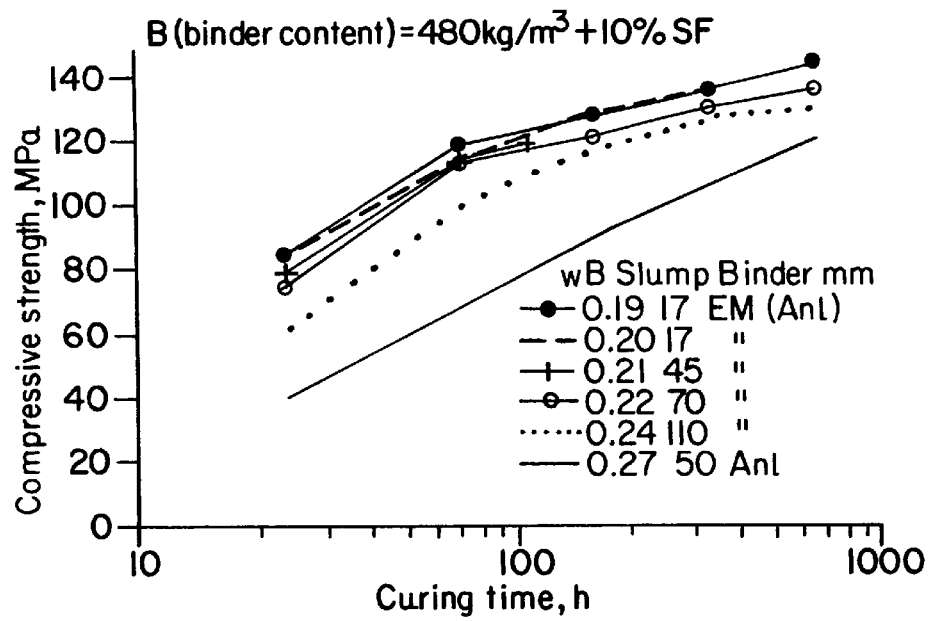
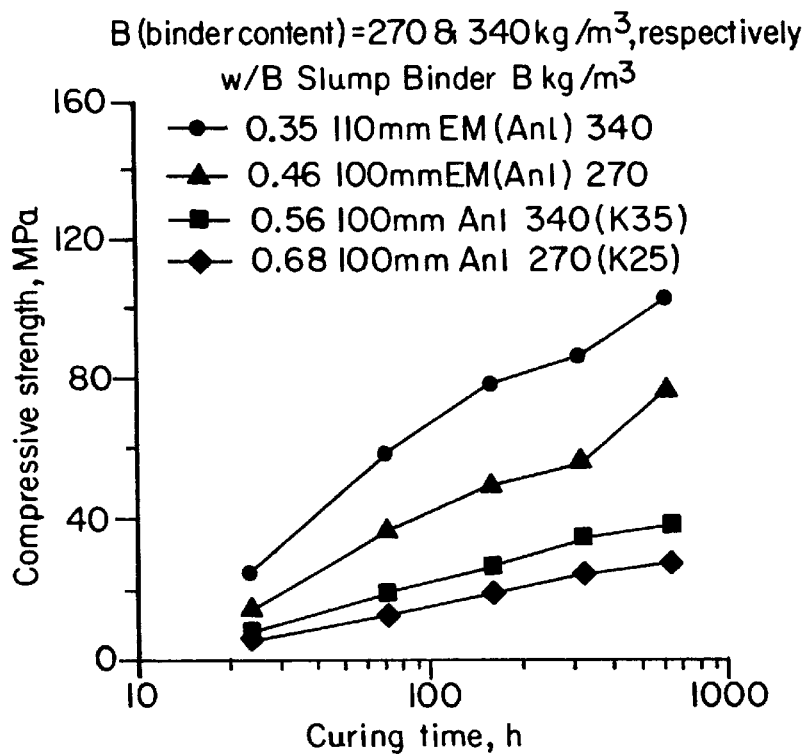

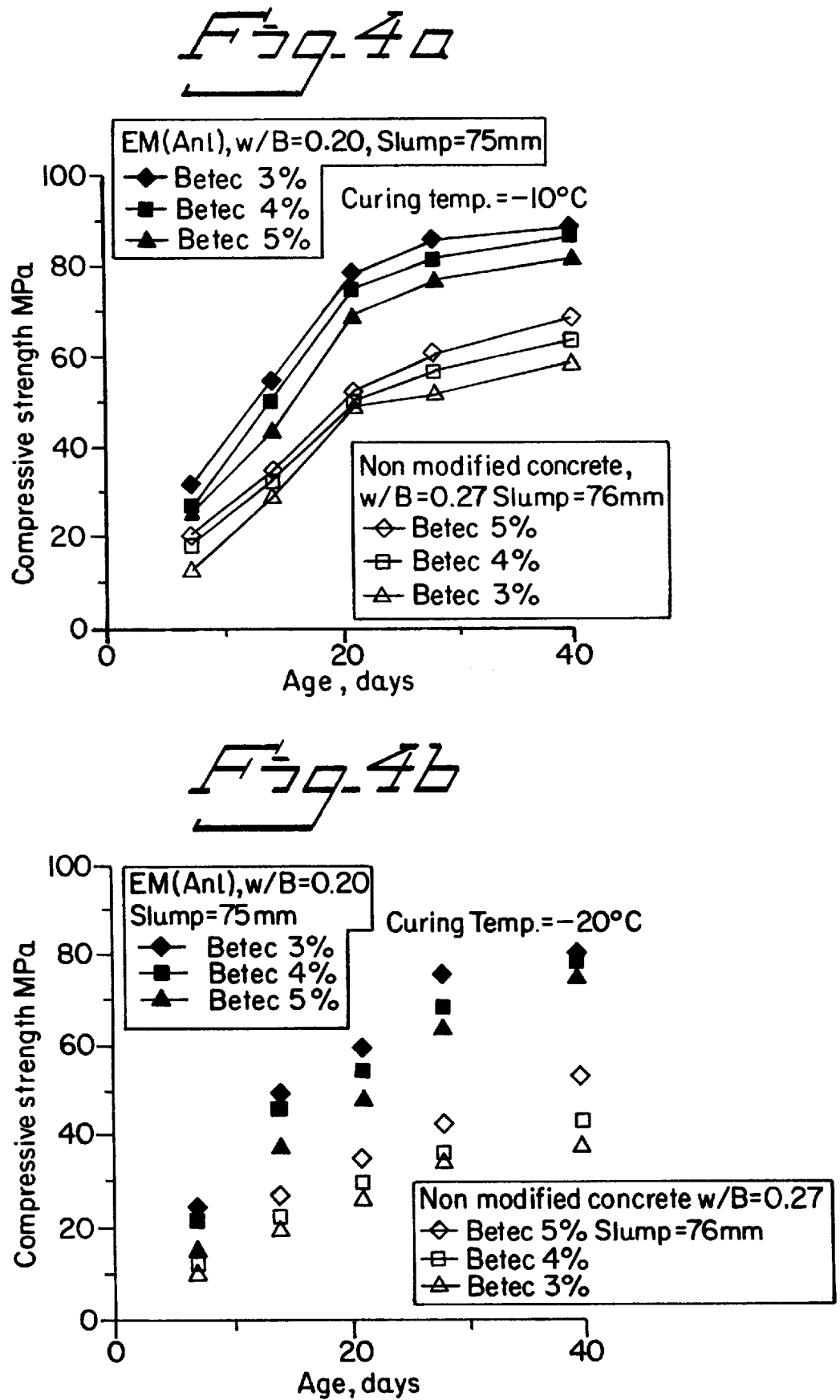

METHOD FOR PRODUCING CEMENT

This application is a 371 of PCT/SE94/00389, filed Apr. 29, 1994.

BACKGROUND OF THE INVENTION

1. Field of the Invention

The present invention relates to a method of producing cement useful for preparing pastes, mortars, concretes and other cement-based materials with high workability at low water content, high strength and strength development and high density. The method includes mechanicochemical treatment of a mineral-polymeric or a mineral mixture of portland cement and a $SiO_2$-containing microfiller, for example silica fume, and/or powdery water reducing agents of melamine or naphthalene type in milling equipment, preferably with vibration grinding media.

2. Description of the Related Art

The prior art closest to the method according to the present invention is a method described in an article in Journal Concrete International, October 1992, page 56 with the title "Intermilled Silica Fume in Icelandic Cement" and the method described in the patent GB 2,006,737 for a "Method and apparatus for production of an activated mineral composition."

The first mentioned method (Concrete International, 1992 "Intermilled Silica Fume in Icelandic Cement") discloses milling of a cement clinker with gypsum and other additives together with silica fume. The last component is added in an amount of 5–7.5% by weight of clinker. By said method one tried to achieve a higher level of homogenization of the blended cement in order to obtain a more stable concrete with high mechanical properties. This method does not include the use of a polymeric component (e.g. powdery water reducing agents). There is no disclosure of any substantial increase of the strength development and of the density of the hardened cement paste or concrete. This is the case because due to high hardness and density of the rather coarse cement clinker particles, practically all the energy of the grinding media is used to crush the material without any significant increase of the surface energy of treated cement and consequently there is no increase of the strength development and ultimate strength of cement pastes, mortars and concretes.

The second mentioned method according to GB 2,006, 737 suggests well known conventional mechanical grinding and activation of fine-grained cement mortar, which consists of ordinary portland cement with an average particle size of about 10 $\mu$m and fine sand with a particle size of 60–1000 $\mu$m (0.06–1.00 mm) in a pinned disk mill or vibration mill.

Due to the nature of mineral mixture components, particle size distribution and parameters of treatment, disclosed by this method, the main part of the consumed energy is used for decreasing the particle size of sand and cement and only a small part of it is stored as surface energy. There are also no basic changes and/or modifications of the material microstructure and main properties of the substance. This can easily be illustrated by the relatively low values of ultimate compressive strength of the mortar obtained with this activated cement, namely 55–65 MPa after 28 days of hardening, and also by a rather short period of strength development, as the hydration of the "activated" cement is almost stopped after 7 days of hardening.

Due to the relatively low level of stored surface energy and due to its relaxation, the cement particles start to lose their obtained properties after 2–3 weeks of storage.

Another serious drawback of this method is a drastic increase of the surface area, which according to generally approved knowledge leads to a required increased amount of water in a concrete mixture, i.e. the water to cement ratio, required to maintain workability (plasticity). According to this known method, the water to cement ratio is rather high, about 0.6. This fact is negative from the point of view of increased porosity, increased shrinkage, limited level of strength and low durability.

SUMMARY OF THE INVENTION

The present invention relates to a method for producing cement useful for preparing pastes, mortars, concretes and other cement-based materials, having a high workability with reduced water content, high strength and density and a rapid development of strength. The method includes a two-stage mechanical treatment of a mixture of cement and at least one of two additional components. The first component includes an $SiO_2$ containing microfiller and the second component includes a polymer in the form of a powdery water reducing agent. In a first stage the cement and said first and/or said second component are intensively mixed in a dry state, whereby particles of the first and/or the second component are adsorbed on the cement particles. In a second stage the mixture obtained in said first stage is treated in milling equipment where the particles in said mixture receive in a quick succession a large number of direct-changed impact impulses resulting in modification of the surface properties of the cement particles in the form of a substantial increase of surface energy and chemical reactivity. The treatment in said second stage is carried out during a sufficiently long period of time in order that a 1-day compressive strength of a 20 millimeter per side cube of cement paste, which has been properly compacted under vibration and hardened at +20° C. in sealed conditions, at least equals 60 MPa.

Further, the invention relates to a process for preparing a shaped concrete element or structure which includes the steps of firstly producing a cement according to the above said method and secondly mixing said cement with sand and/or aggregates of greater dimensions and water, and thirdly casting a shaped element or structure and hardening of the subject.

Still further, the invention relates to the use of cement produced by the method described above as an additive to a cement, such as ordinary portland cement, as an accelerator of the hardening process of such mixture.

BRIEF DESCRIPTION OF THE DRAWINGS

The invention is described in greater detail in the following description, partly in connection with Tables and Figures, wherein In FIG. 1 the curve marked 1 refers to cement according to the present invention, the curve marked 2 refers to cement+5% silica fume according to prior art and the curve marked 3 refers to cement according to the prior art.

FIGS. 2a and 2b respectively are diagrams showing strength development of concretes cured at 20° C. In FIGS. 2a and 2b EM(An1) stands for concrete with the cement according to the present invention. An1 stands for concrete according to the prior art.

In FIG. 3 EMC (An1) stands for concrete according to the present invention. An1 stands for concrete according to the prior art.

FIGS. 4a and 4b respectively are diagrams showing strength development for concrete with a binder content of 480 kg/m$^3$ cured at negative temperatures with the antifreezing admixture "BETEC". EM(An1) stands for concrete according to the present invention. An1 stands for concrete according to prior art.

In FIG. 7 the curve marked 1 refers to cement paste according to the prior art, the curve marked 2 refers to cement paste with 10% silica fume according to the prior art and the curve marked 3 refers to cement paste according to the present invention.

DESCRIPTION OF THE PREFERRED EMBODIMENTS

Figure 1:
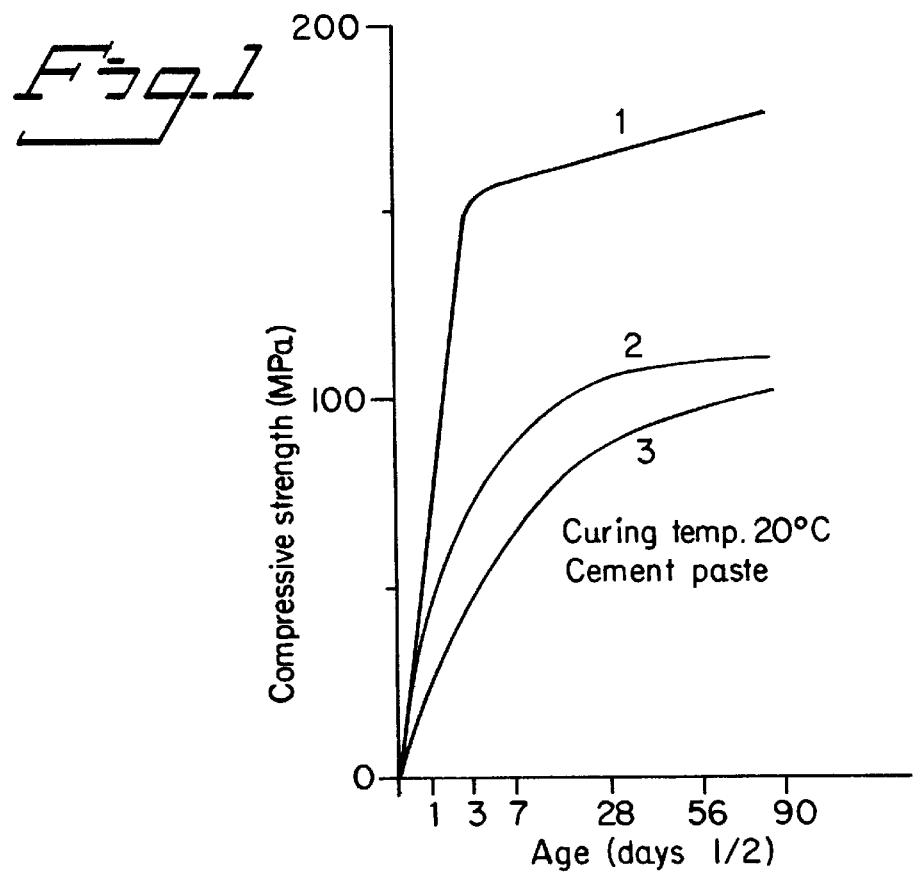
FIG. 1 is a diagram showing strength development at 20° C. curing for cement paste.

It has now been found that when treating a combined mineral-polymeric or mineral mixture of portland cement and SiO$_2$-containing microfiller, preferably silica fume and/ or polymer in the form of powdery water-reducing agent together with media milling equipment (e.g. stirred, centrifugal, tumbling ball) or non-media milling equipment (e.g. jet, impact, roller), preferably in mills with cylbeps' vibration grinding media much more improved mechanicochemical activation of the cement takes place. This treatment also leads to the basic changes and modification of the material microstructure and its properties. During the mechanicochemical treatment according to the present invention several processes take place simultaneously.

Firstly, every particle of the portland cement, microfiller and/or powdery reducing agent receives a large number of direct-changing, randomly distributed impact impulses in a quick succession from the grinding media and other elements of the milling equipment. During this treatment finer and lighter particles of the microfiller (silica fume) and/or the powdery water-reducing agent build up a cover around the cement particles. This cover then acts as lubrication between the cement particles and the grinding media.

Secondly, the newly formed cover of silica fume and/or powdery water-reducing agent particles transforms the impact impulses of the grinding media and all the potential and kinetic energy of the grinding media and other elements of the milling equipment (e.g. stators, rotors and etc.) to create mainly shape deformations and microdefects of the cement particle surfaces.

The present process drastically increases the surface energy and chemical reactivity of the cement particles. Besides, due to the absorption of silica fume and/or powdery water-reducing agent the particles will obtain an electrostatic charge and are attracted to each other promoting consolidation and agglomeration of the particles, which will prevent any substantial increase of the cement paste water demand.

Thus, due to the mechanicochemical treatment according to the present invention a discontinuous network of the new modified binder material on the surface of the cement grains and microdefects inside the surface of the cement grains are created. This new binder has an extremely high chemical reactivity and high hydrophobic properties (mainly in the case of use of a powdery water-reducing) agent. In our opinion the layers of this new binder have a very high potential of nucleigeneration and improves the hydration process especially in the early age period of the hardening process, where the compressive strength of the cement pastes and concretes with the cement obtained according to the present invention is up to 300% higher than the conventional reference pastes and concretes.

Furthermore, this new binder creates and maintains the metastability of the system and this gives a possibility for cements, produced according to our present invention, to hydrate in a more prolonged period of time and to reach a higher rate of strength development.

At this moment we cannot provide a full theoretical explanation of the phenomena, but the description mentioned above gives, according to our opinion, a basic phenomenological picture of the process according to the present invention.

The cement produced according to the present invention has surprising properties, which have no analogs in modern technology today. This complex of properties cannot be obtained by any other known method.

The properties of the material treated according to the present invention can be listed as follows:

the cement produced according to present invention keeps all properties as commercially produced (portland) cement during a rather long period of storage (more than 9 months) according to the requirements of building practice;

up to 50% decrease of water demand is obtained in comparison with ordinary cement with preservation and even improvement of the level of consistency of the cement paste and workability of the concrete mixture, see tables 1 and 2, which leads to a creation of a more dense structure and a high strength of the material.

Table 1 refers to influence of the present method on the consistency of cement paste.

Table 2 refers to influence of the present method on the workability of a concrete mixture.

TABLE 1 influence of the method of cement treatment on the normal consistency of the cement paste.

| No | Type of cement | Composition of binder | | Normal consistency, water % to binder weight |
|---|---|---|---|---|
| 1 | Binder treated according to the present invention | Portland cement = silica fume = powdery water = reducing agent ("MIGHTY 100") | 94% 5% 1% | 15,0% |
| 2 | Ordinary portland cement | Portland cement | 100% | 28,3% |
| 3 | Binder treated according to prior art method | Portland cement = silica fume = Powdery water- = reducing agent ("MIGHTY 100") | 94% 5% 1% | 23,8% |

TABLE 2 influence of the method of cement treatment on the workability of the concrete mixture.

Figure 3:
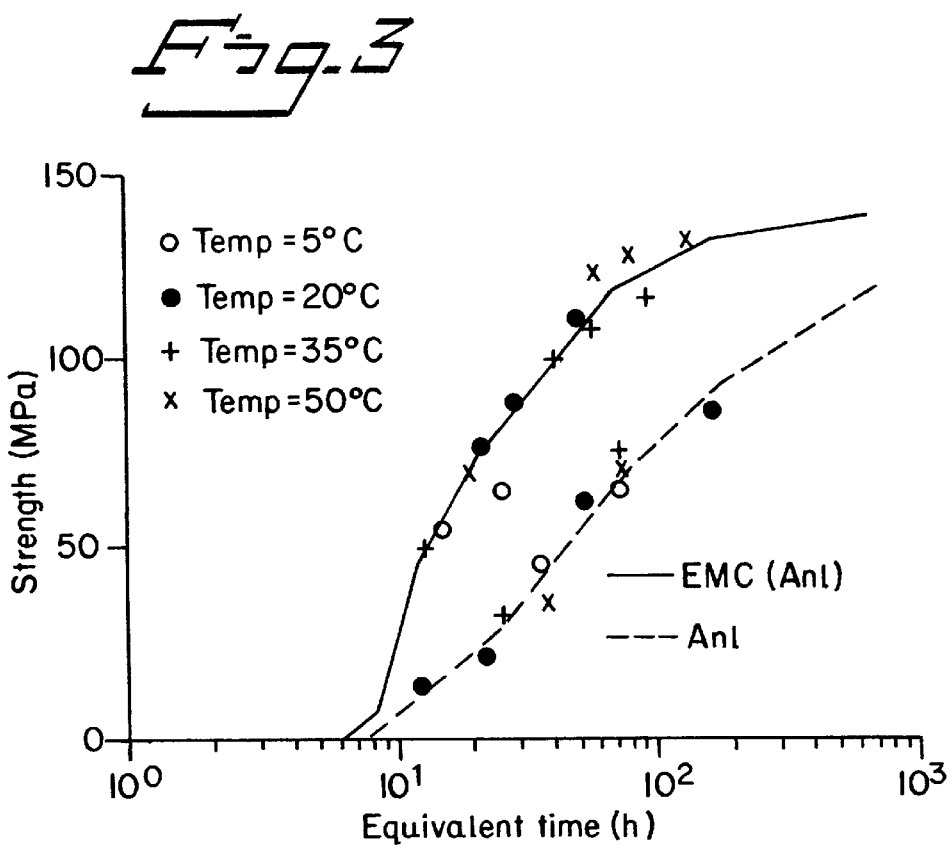
FIG. 3 is a diagram showing compressive strength as a function of temperature-equivalent time.
Figure 5:
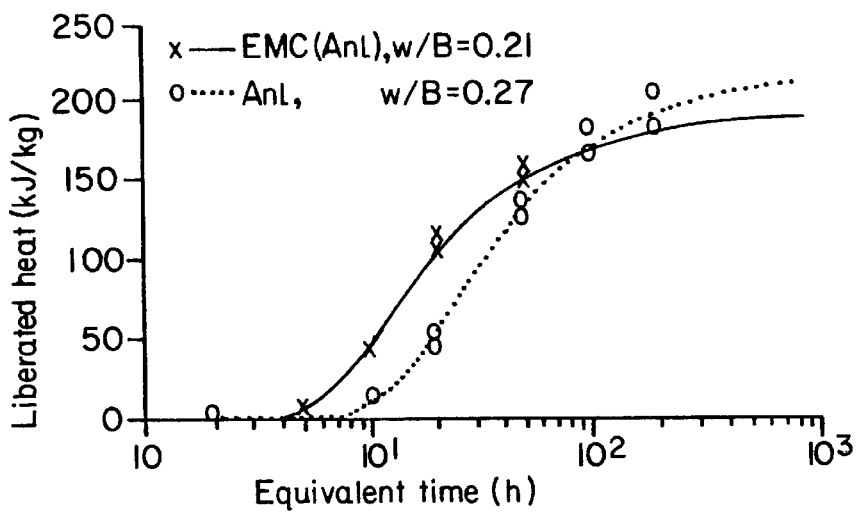
FIG. 5 is a diagram showing liberated heat as a function of temperature-equivalent time. EMC(An1) stands for concrete according to the present invention. An1 stands for Concrete according to the prior art.
Figure 7:
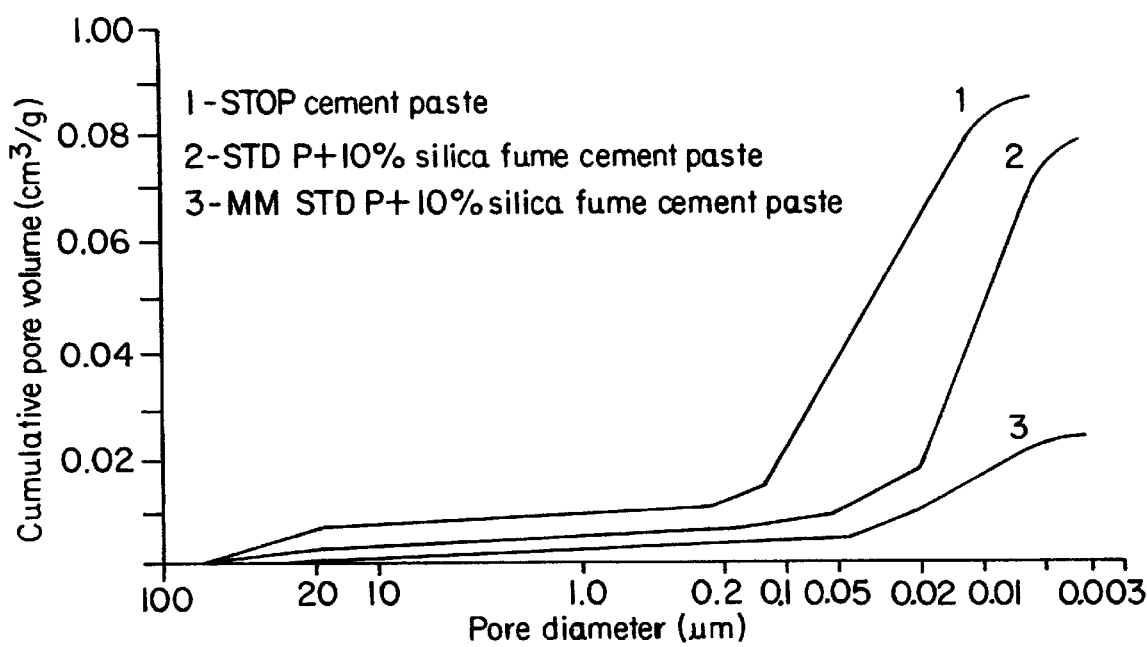
FIG. 7 is a diagram showing pore size distribution.

| No | Type of cement | Cement content kg/m3 | Water to cement ratio W/C | Workability slump mm |
|---|---|---|---|---|
| 1 | Cement treated according to present invention | 480 | 0,21 | 47 |
| 2 | Cement treated according to present invention | 480 | 0,27 | 150 |
| 3 | Cement treated according to present invention | 340 | 0,35 | 100 |
| 4 | Cement treated according to present invention | 270 | 0,46 | 105 |
| 5 | Cement treated acc. to prior art method | 480 480 | 0,21 0,27 | No slump C 50 |
| 6 | Cement treated acc. to prior art method | 340 340 | 0,35 0,56 | No slump C 92 |
| 7 | Cement treated acc. to prior art method | 270 | 0,70 | 100 | the rate of the strength development of the cement paste and concrete is drastically increased in a wide range of positive curing temperatures, namely from +5° to +50° C., see FIGS. 1, 2 and 3. More intensive hardening of concrete also takes place at negative temperatures, namely at −10° C. and −20 C. when used with an antifreezing admixture, see FIG. 4. The properties mentioned above provide the reduction of form removal time, gives a lower risk to easy freezing, a substantial decrease of the building process and a simplification of winter concreting operations.

concretes produced with the use of cement manufactured according to the present invention have approximately the same resulting heat of hydration per cement weight with a slightly higher rate of heat liberation in comparison with concretes prepared by the prior art method, see FIG. 5. At the same time concretes produced with the cement according to the present invention have significantly lower heat production per strength unit than concretes prepared by the prior art method, see FIG. 6. This reduces the probability of thermocracking.

porosity of the cement paste is reduced to less than half compared with prior art methods, see FIG. 7. The concrete becomes practically impermeable and durable;

intensive self-desiccation of the concrete takes place together with strength increase at the early age of hardening. The values of the relative humidity are approximately 72–74% already after ten days of curing in sealed conditions and at room temperature.

As stated above, the method according to the invention includes a two-stage mechanicochemical treatment of a mixture of cement and at least one of two additional components, the first component being a $SiO_2$ containing microfiller and the second component being a polymer in the form of a powdery water-reducing agent.

This means that the invention covers three different cases, namely a first case where cement and both the first and the second components are mixed, a second case where the cement is only mixed with the second component and a third case where the cement is only mixed with the first component.

Certainly, the compressive strength will vary depending on what composition the mixture has according to said three different cases.

Further, it is stated above that said treatment, according to the second stage of the method, is carried out during a sufficiently long period of time in order that a 1-day compressive strength of a 20 millimeter per side cube of cement paste, which has been properly compacted under vibration and hardened at +20° C. in sealed conditions, at least equals 60 MPa.

According to a preferred embodiment said treatment is carried out during a period of time such that said compressive strength is at least 70 MPa, in the case of a mineral-polymeric mixture comprising 94% of ordinary portland cement, 5% of silica fume and 1% of a powdery water reducing agent named "MIGHTY 100", and in addition 16% of water by the weight of the solid components.

According to another preferred embodiment said treatment is carried out during a period of time such that said compressive strength is at least 65 MPa, in the case of a mineral-polymeric mixture comprising 99.0% of ordinary portland cement, 1% of a powdery water reducing agent named MIGHTY 100, and in addition 16% of water by the weight of the solid components.

According to still another preferred embodiment said treatment is carried our during a period of time such that said compressive strength is at least 60 MPa, in the case of a mineral mixture comprising 95% of ordinary portland cement, 5% of silica fume, and in addition 16% of water by the weight of the solid components.

According to the present invention the method for producing cement useful for ultra high strength and high density concrete comprises the steps of:

1. Dosage of the solid components;
2. Dry mixing of the solid components;
3. Mechanicochemical treatment of the combined mixture in the milling equipment, preferably in a vibration mill where every particle of the mixture receives a large number of direct-changing, randomly distributed impact pulses.

The dry mixing in said first stage is carried out in such a way that the mixture is treated in a highly intensive mixer or in said milling equipment with parameters of treatment adjusted to the mixture composition.

According to the present invention the mechanicochemical treatment of a combined mineral-polymeric or mineral mixture of portland cement and $SiO_2$-containing microfiller and/or powdery water-reducing agent is carried out in a media milling equipment (e.g. stirred, centrifugal, tumbling ball and etc.) or a non-media milling equipment (e.g. jet, impact, roller).

Media milling equipment includes mills employing grinding media in the form of balls, cylinders, cylbeps etc., e. g. tumbling ball mills and vibratory mills, or high speed agitators, e.g. stirred mills etc.. In this type of mill the treatment of the mixture according to the present invention takes place mainly due to the fact that every particle of the mixture receives a large number of impact impulses from the grinding media in quick succession.

In non-media milling equipment treatment of the mixture takes place due to subjecting the particles to a high pressure from a moving roller or hammer, e.g. roller or impact mills, or due to mostly particle to particle impacts or collisions of particles with a target depending on the design, e.g. fluid energy jet mills, which result in modification of particle surface properties.

The preferable equipment is a vibration mill characterized by the diameter of the vibration cycle being, preferably, from 2 to 30 mm and frequency being, preferably, from 800 to 2000 rpm.

The parameters of treatment in other types of milling equipment should be adjusted to the composition of the mixture subjected to treatment in such a way that the mechanical treatment corresponds to that obtained in a vibration mill.

According to the present invention the treatment in the milling equipment takes place in a batch regime with the time of treatment, preferably from 3 to 60 min, or continuously, with the feed rate adjusted to the type of the mill and composition of the mixture.

In the case of using a media milling equipment, preferably a vibration mill, the proportion between the grinding media and the mixture subjected to treatment, i.e. media to feed ratio, is preferably from 7:1 to 15:1 by weight.

The preferred grinding media of the vibration mill is a mixture of cylbeps, i.e. cylinders with rounded ends made from e.g. aluminum or bodies with an aluminum oxide cover or steel, with equal height and a diameter of 12 and 9 mm, respectively. The proportion between the two parts is from 2:1 to 1:2 by weight, preferably 1:1 by weight.

The components in the blended cement are present in the following maximum limits of weight ranges:

portland cement=98.9%
$SiO_2$-containing microfiller=20%
powdery water-reducing agent=3%.

The preferable weight ranges of the components in the blended cement are:

portland cement=89.5–96.7%
$SiO_2$-containing microfiller=3–10%
powdery water-reducing agent=0.3–1.5%.

Different types of portland cement, and also in combination with other types of cement, can be used according to the present invention.

$SiO_2$-containing components are useful as microfillers. They have a particle diameter which preferably is lower than 1 $\mu$m. The microfiller can be silica fume, ground sand, etc., preferably silica fume (microsilica).

The silica fume preferably used in this invention comprises extremely small spherical, amorphous particles containing at least 85% by weight of $SiO_2$. The specific surface area is between 15 and 30 $m^2/g$ and the particles have a diameter between 0.1 and 0.2 $\mu$m. Silica fume is normally obtained from off-gases from electric smelting furnaces used for production of silicon and ferrosilicon, but it can also be produced by reduction of $SiO_2$ to SiO-gas and reoxidation of SiO in air.

Powdery, solid state, water-reduction agents preferably used according to the present invention may be water-reducing agents of melamine or naphthalene type known to be used in ordinary concrete, for example "MIGHTY 100".

According to the present invention the ratio between the specific surface areas of the mineral components, i.e. cement and $SiO_2$-containing microfiller, in the mixture preferably is 1:10 to 25. The ratio between the specific surface areas of the mineral part in the combined mixture, i.e. cement with $SiO_2$-containing microfiller, and the polymeric part, i.e. powdery water-reducing agent, preferably is 1:0.10 to 2.0.

According to a preferred embodiment of the present invention different inorganic materials, e.g. slag, milled sand, metal fibers etc., and/or organic materials, e.g. polymers, polymer fibers etc., which materials influence the rheological, the mechanical the durability and other properties of the fresh and hardened paste, mortar or concrete, are added to the treated mixture or to the mixture during the treatment.

According to a further preferred embodiment of the invention the above said treatment takes place at a raised or reduced pressure, alternatively in the presence of a protective gas.

A process for preparing a shaped concrete element or structure with the use of the present invention comprises the following steps:

1. Dosage of the portland cement and $SiO_2$-containing microfillers and/or powdery water-reducing agent;

2. Dry mixing of the above mentioned components;

3. Mechanicochemical treatment of the combined mixture in milling equipment according to the specification of the present invention according to the process described above;

4. Mixing the obtained cement with sand and aggregates and water, casting a shaped element or structure and hardening the concrete.

The invention is illustrated by means of the following examples. However, the following examples are not intended to restrict the invention in any manner.

EXAMPLES

The ordinary portland cement (OPC), produced by Cementa AB Sweden, silica fume produced by Elkem A/S, Norway and powdery water-reducing agent "MIGHTY 100", produced in Japan, were chosen in these experiments.

The mixtures according to the present invention were subjected to mechanicochemical treatment in the first stage by intensive mixing in a mixer named "TONIMIX" with a rotation speed of 280 rpm during 3 minutes. The mixer is made by TONI Technik, Germany.

Compositions of the blended cements are presented in Table 1. The blended cements were subjected to mechanicochemical treatment according to the present invention in a vibration mill having a diameter of the vibration circle of 10 mm, operating at a frequency of 1100 rpm during a period of treatment of 30 minutes. The proportion between the grinding media and mixture was 9:1 by weight.

In the control mixture silica fume and water-reducing agent were introduced with water during mixing of the cement paste or concrete mixture.

Table 2 presents characteristics of the concrete mixtures obtained with treatment according to the present invention and untreated cements, i.e. conventional cements.

In concrete mixtures cured at negative temperatures (–10° C. and –20° C.) an antifreezing admixture "BETEC", produced by Finja Betec AB, Sweden, was used.

The cement paste and concrete were tested with the use of cubes with 20 mm and 100 mm sides, respectively. A Hobart mixer was used for mixing the cement paste for 2 minutes. A pan mixer was used for mixing of the concrete mixture for 3 minutes.

A mercury porosimeter Pore Size –9310 (Micrometers) was used for the examination of the cement paste porosity.

The temperature effect on the hardening process was studied by measurements of strength growth at different hardening temperatures, namely 5°, 20°, 35° and 50° C., respectively. The test samples were cube-shaped bodies having the dimensions 100×100×100 mm and were stored in water.

Liberated heat at hydration of the concrete was calculated from measurements of the temperature development during adiabatic and semi-adiabatic conditions. Each test specimen was about four liters of concrete placed in a bucket of thin walled steel.

From the results presented in Tables 1 and 2 and FIGS. 1–4 it can be clearly seen that the strength development and ultimate strength of the concretes prepared with the use of cement according to the present invention are substantially higher in a wide range of curing temperatures in comparison with the conventional reference concretes.

The cement pastes with treated cements are characterized by a much lower porosity, as is shown in FIG. 7.

Figure 6:
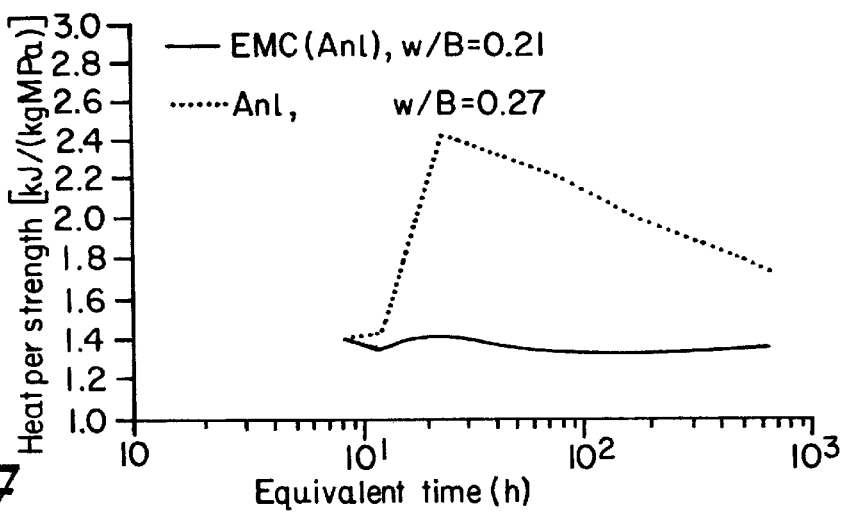
FIG. 6 is a diagram showing liberated heat per strength unit as a function of temperature-equivalent time. EMC (An1) stands for concrete according to the present invention. An1 stands for concrete according to the prior art.

The liberated heat due to hydration per strength unit for concretes with treated cements is lower than for reference concretes, as is shown in FIG. 6.

There is a wide range of suitable applications for the cement produced according to present invention. The applications include concrete element production, winter concreting, repair of buildings and rehabilitation, roads, floors, topping of concrete, etc.

What is claimed is:

1. A method for producing cement useful for preparing pastes, mortars, concretes or other cement-based materials, which method comprises: providing cement particles and at least one of a first component including an $SiO_2$ containing microfiller and a second component including a polymer in the form of a powdery water-reducing agent, mixing the cement and said at least one component intensively in a first treatment stage and in a dry state, whereby particles of the at least one component are adsorbed on surfaces of the cement particles to produce a resulting mixture of dry, coated cement particles, impacting the dry, coated cement particles from the first treatment stage during a second treatment stage in a milling device in which the coated cement particles in said mixture receive in quick succession a plurality of direct-changed impact impulses for producing shape deformations and microdefects in surfaces of the cement particles, resulting in modification of surface activity properties of the cement particles which provide to the cement particles increased surface energy and chemical reactivity so that the cement particles are attracted to each other to promote consolidation and agglomeration of the particles, and continuing said second treatment stage for a sufficient period of time in order that a 1-day compressive strength of a 20 millimeter per side cube of cement paste, which has been compacted under vibration and hardened at +20° C. in a sealed container is at least equal to 60 MPa.

2. A method according to claim 1, wherein the impacting step is performed in a vibrating milling device, with cylbeps as a vibrating milling medium, and wherein the milling device has a vibration cycle having an amplitude of from 2 to 30 mm and a frequency of vibration of from 800 to 2000 rpm.

3. A method according to claim 1, wherein said compressive strength is at least 70 MPa for a mineral-polymeric mixture comprising 94% of ordinary portland cement, 5% of silica fume, 1% of a powdery water-reducing agent, and 16% of water by weight of solid components of the mixture.

4. A method according to claim 1, wherein said compressive strength is at least 65 MPa for a mineral-polymeric mixture comprising 99.0% of ordinary portland cement, 1% of a powdery water-reducing agent, and 16% of water by weight of solid components of the mixture.

5. A method according to claim 1, wherein said compressive strength is at least 60 MPa for a mineral mixture comprising 95.0% of ordinary portland cement, 5% of silica fume, and 16% of water by weight of solid components of the mixture.

6. A method according to claim 1, wherein the impacting step takes place for a time of from 3 to 60 minutes.

7. A method according to claim 2, wherein milling occurs in a media mill device and the proportion between grinding media in the mill and the mixture subjected to treatment, is from 7:1 to 15:1 by weight.

8. A method according to claim 1, wherein the mixture comprises 98.9% portland cement; 20% $SiO_2$-containing microfiller and 3% of a polymer in the form of a powdery water-reducing agent.

9. A method according to claim 1, wherein the mixture has a ratio of specific surface areas of the cement to $SiO_2$-containing microfiller of 1:10 to 1:25 and a ratio of specific surface areas of the coated cement particles to the powdery water-reducing agent, of 1:0.1 to 1:2.0.

10. A method according to claim 1, wherein the powdery water-reducing agent is a melamine-containing reducing agent and the $SiO_2$-containing microfiller is silica fume.

11. A method according to claim 1, further comprising the step of adding inorganic materials selected from the group consisting of slag, milled sand, and metal fibers to the mixture during the mixing step.

12. A method according to claim 1, wherein mixing takes place at an elevated pressure.

13. A process for preparing a shaped concrete element or structure which comprises the steps of producing a cement according to the method of claim 1, mixing said cement with water and one of fine aggregate or coarse aggregate, casting a shaped element and hardening the shaped element.

14. A method for producing cement useful for preparing pastes, mortars, concretes or other cement-based materials, which method comprises: preparing a cement-based composition in accordance with claim 1 and adding the cement-based composition to a portland cement composition.

15. A method according to claim 1, wherein the milling step takes place continuously.

16. A method according to claim 1, wherein the powdery water-reducing agent is a naphthalene-containing water-reducing agent and the $SiO_2$-containing microfiller is silica fume.

17. A method according to claim 1, further comprising the step of adding organic materials comprising polymers or polymer fibers to the mixture during the mixing step.

18. A method according to claim 1, wherein mixing takes place at a reduced pressure.

19. A method according to claim 12, wherein mixing takes place in the presence of gas.

20. A method according to claim 18, wherein mixing takes place in the presence of gas.

* * * * *